Jan. 24, 1956 J. L. DE CELLES 2,732,538
ALTIMETER GLIDESLOPE FOR DISTANCE MEASURING EQUIPMENT
Filed Feb. 2, 1953 2 Sheets-Sheet 1

INVENTOR.
Joseph L. DeCelles
BY
ATTORNEY.

Jan. 24, 1956

J. L. DE CELLES 2,732,538

ALTIMETER GLIDESLOPE FOR DISTANCE MEASURING EQUIPMENT

Filed Feb. 2, 1953

INVENTOR.
Joseph L. DeCelles
BY
ATTORNEY.

United States Patent Office 2,732,538
Patented Jan. 24, 1956

2,732,538

ALTIMETER GLIDESLOPE FOR DISTANCE MEASURING EQUIPMENT

Joseph L. De Celles, Levittown, N. Y., assignor to Trans World Airlines, Inc., Kansas City, Mo., a corporation of Delaware Application February 2, 1953, Serial No. 334,497

9 Claims. (Cl. 340—26)

This invention relates to aircraft and, more particularly, to aircraft instrumentation. It contemplates the provision of apparatus cooperable with the altimeter and distance measuring equipment of an aircraft having the same to produce glide-slope altitude-reference indications simultaneously observable and directly comparable by the pilot of the aircraft with his observations of altitude indications of the altimeter. Broadly stated, the apparatus of this invention includes indicating structure at the altimeter of the aircraft and means for controlling the operation of such indicating structure in response to intelligence available from the distance measuring equipment of the aircraft.

Prior glide-slope indicating systems have each proven to be either inaccurate and unreliable, prohibitively expensive, or relatively hazardous, in that, by the provision of additional or alternative instruments to be watched by the pilot during a blind, glide-slope approach for a landing, they have drawn the pilot's attention away from the altimeter of the aircraft. Such diversion of the pilot's attention away from the altimeter constitutes one of the most important deficiencies of prior blind approach systems and has resulted in unnecessary accidents caused by a pilot, in his concentration to keep the aircraft on the proper glide-slope through actions based upon observation of instruments other than the altimeter, inadvertently permitting the aircraft to proceed to an unwarrantedly low altitude.

Accordingly, the principal aim of this invention is to overcome the above-mentioned and other failures and shortcomings of prior systems and apparatus for providing glide-slope information to be used by the pilots of aircraft in making blind approaches for landings.

A most important object of this invention is, therefore, to provide a glide-slope altitude-reference indicating device adapted for presenting such indications at the altimeter itself in such manner that the pilot's attention may remain directed toward the altimeter of the aircraft during blind approaches.

Another most important object of this invention is to provide such an indicating device that is adapted, by associated parts of the apparatus contemplated by this invention, for being controlled automatically during a blind approach by the normal output available from aircraft distance measuring equipment such as has recently been developed and is currently being installed in commercial airline aircraft.

An important object of this invention is to provide an altitude-reference indicating device adapted for presenting clear and unmistakable indications of the proper glide-slope altitude continuously during a blind approach and for so presenting such indications that the pilot's view of the indicating pointers of the aircraft's altimeter is not impaired.

Still another important object of this invention is to provide apparatus adapted for continuously indicating the desired glide-slope altitude in such a fashion that the pilot may keep the aircraft on the proper elevational glide-slope merely by maneuvering the aircraft to maintain the altitude indicating pointer in predetermined, "matched" relationship with clear reference markings provided on a glide-slope altitude-reference indicating device associated with the aircraft's altimeter.

Another important object of this invention is to provide accurate and reliable means forming a part of the apparatus and adapted for controlling the positioning of the glide-slope indicating device in response to the output available from aircraft distance measuring equipment in such manner that the desired glide-slope altitude indicated by the device corresponds at any given moment during a blind approach to the measurement made by the equipment of the distance of the aircraft from a preselected ground point.

Other important objects of this invention include the way in which the glide-slope altitude indicating device of the apparatus contemplated hereby is adaptable for mounting either by separate structure in proximity to an existing altimeter in an aircraft or by structure forming an integral part of a modified type of altimeter; the way in which the apparatus contemplated may be controlled by and rendered responsive to either an electrical or a mechanical output from aircraft distance measuring equipment; and the way in which the other objects of the invention may be attained with relatively simple and inexpensive apparatus, which may be easily installed in existing aircraft with only minor modifications of the latter.

Still other objects of this invention, including certain details of construction, will be made clear or become apparent as the following specification progresses.

Referring now to the accompanying drawings.

Figures 6, 7:
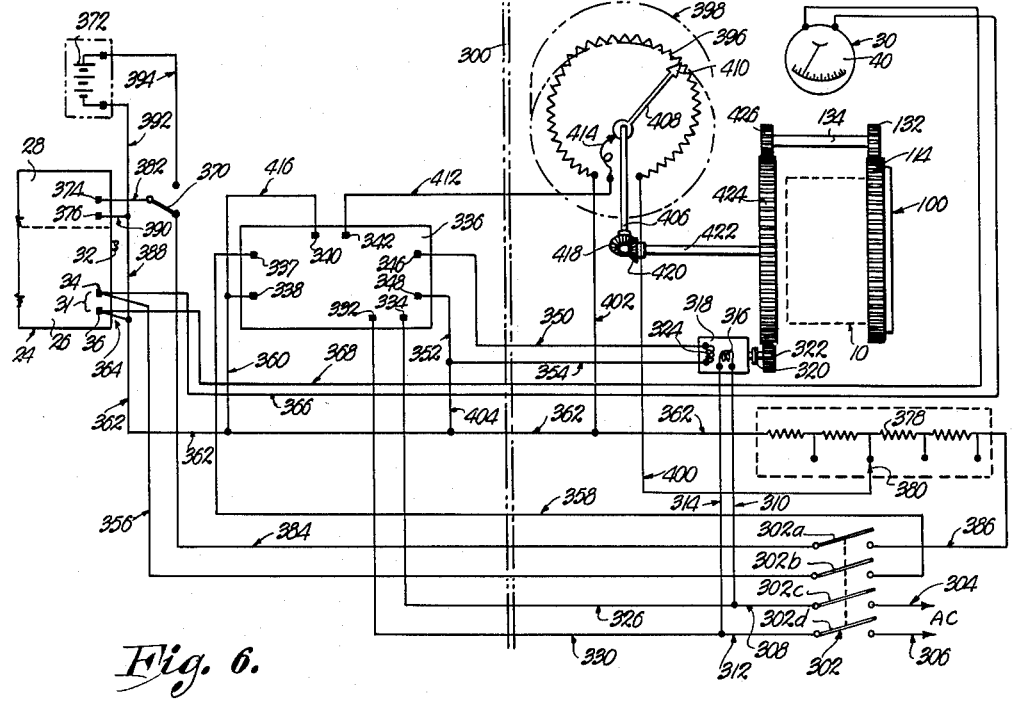

Fig. 6 is a diagrammatic view of one form of the control means forming a part of this invention, said form being particularly adapted for coupling to the electrical output of the distance measuring equipment of the aircraft, certain electrical parts being shown schematically and others in block representation, and certain mechanical parts being shown in elevation and others in perspective, as required to best attain clarity; and Fig. 7 is a diagrammatic view of another form of the control means forming a part of this invention, said form being particularly adapted for coupling to the mechanical output of the distance measuring equipment of the aircraft, certain electrical parts being shown schematically and others in block representation and certain mechanical parts being shown in elevation and others in perspective, as required to best attain clarity.

Modern aircraft are commonly provided with both an altimeter and distance measuring equipment. Neither altimeters nor distance measuring equipment, as such, are included in the scope of this invention. However, since this invention does involve apparatus cooperable with both, a brief description of their functioning and certain inherent structural features thereof will be given.

In the accompanying drawings, the altimeter of an aircraft is broadly designated by the numeral 10. Altimeter 10 may include a cylindrical rear housing 12 containing conventional mechanism (not shown) for continuously measuring the altitude of the aircraft and operatively coupled to altitude indicating hands 14 and 16 for rotating the latter to indicate the altitude of the aircraft upon a calibrated dial face 18, the longer hand 16 making one revolution for each 1000 feet of altitude change. Altimeter 10 may also conventionally include forward housing structure broadly designated by the numeral 20, holding a transparent circular crystal 22 in covering, spaced relationship to the dial face 18 and hands 14 and 16.

A system of apparatus for continuously measuring the distance or range of an airborne aircraft from a preselected ground point, when the aircraft is within a predetermined maximum range of such ground point, is known in the art as "distance measuring equipment," or more frequently, and therefore sometimes hereinafter, as a "DME." Currently favored types of DME utilize a radio-wave, intermittent pulse transmitter on the aircraft, a receiver for the pulses transmitted from the aircraft located at the airport and adapted for triggering a slave-pulse transmitter to transmit back to the aircraft a slave-pulse for each pulse received from the aircraft, a receiver on the aircraft for receiving the slave-pulses from the transmitter on the ground, means for measuring the time elapsed between the transmission of a pulse from the aircraft and the reception at the aircraft of the corresponding slave-pulse from the ground, and means for converting such measurements of pulse transit time into a variable output corresponding to the distance of the aircraft from the airport, which output is capable of controlling a mechanism for continuously indicating said distance so measured.

In Figs. 6 and 7 of the accompanying drawings, that portion of a DME 24 pertinent to this invention, because of the cooperation between same and the apparatus constituting this invention, includes an output section 26, a power supply section 28, and an indicating device 30. Although some earlier types of DME have been constructed with an output section 26 having only one of either an electrical output or a mechanical output, and it is contemplated that the apparatus included in this invention may be used with either and is so adapted, the currently preferred type of DME 24 is provided with both an electrical and a mechanical variable output 31 and 32, respectively, so that either may be used for controlling the apparatus of this invention.

The electrical output means 31 of section 26 of DME 24 comprises a pair of output terminals 34 and 36 connected to apparatus (not shown) within DME 24 for continuously presenting between terminals 34 and 36 a variable direct current potential corresponding in voltage magnitude to the distance of the aircraft from the airport, as measured by other parts (not shown) of DME 24. For example, a particular DME 24 may be designed for the measurement of distances up to 100 miles and may be adapted to provide a voltage output at terminals 34 and 36 corresponding to the measured distance on a scale of 2 volts equal one mile. In such a case, when the aircraft is 100 miles from the airport, the voltage across terminals 34 and 36 would be 200 volts; when the distance was 99 miles, 198 volts; 40 miles, 80 volts; etc. Thus, the magnitude of the voltage across the terminals 34 and 36 corresponds to the range of the aircraft from the airport. In operation of the DME 24 to provide range indications, the output of terminals 34 and 36 would be coupled to an indicating device 30 comprising a voltmeter 40, calibrated in miles of range on a scale of 2 volts per mile. It is to be understood that use of the apparatus of this invention will not interfere with the continued use also of the range-indicating voltmeter 40, and that such continued use is contemplated.

The mechanical output means 32 of section 26 of DME 24 comprises a rotatable shaft 32 operably coupled to apparatus (not shown) within DME 24 for continuously maintaining shaft 32 in a position of relative rotation corresponding to the distance of the aircraft from the airport, as measured by other parts (not shown) of DME 24. For example, a particular DME 24 may be designed for the measurement of distances up to 100 miles and will, accordingly, be adapted to rotate the shaft 32 one full revolution during movement of the aircraft from a position at range 100 miles to a position at range zero, or in other words 3.6 angular degrees per mile of change in range. The indicating section (corresponding functionally to the device 30 shown in Fig. 6, but for convenience not shown, since it forms no part of this invention) could include a mechanically rotatable, range-indicating pointer and a corresponding calibrated scale, the pointer being operably coupled to the rotatable shaft 32 of DME 24 for corresponding rotation therewith, such coupling being conventionally accomplished through the use of a syncro-transmitter and a syncro-follower in well known manner, in order to permit mounting of the range indicating pointer remote from DME 24 at a place where same may be conveniently observed by the pilot. As with the indicating device 30 of Fig. 6, the provision of its mechanical equivalent for use with the apparatus of Fig. 7 will not interfere with the operation of the apparatus provided by this invention, nor vice versa.

It is also notable that in a DME 24 of the preferred type having both electrical output means 31 and mechanical output means 32 both outputs may be utilized; for instance, the particular output means 31 or 32 being used in an aircraft to operate the range indicating device 30 or its mechanical equivalent, as above described, may be continued in such function when the apparatus of this invention is added to the aircraft, the other output 31 or 32 being used to operate the latter.

Figure 1:
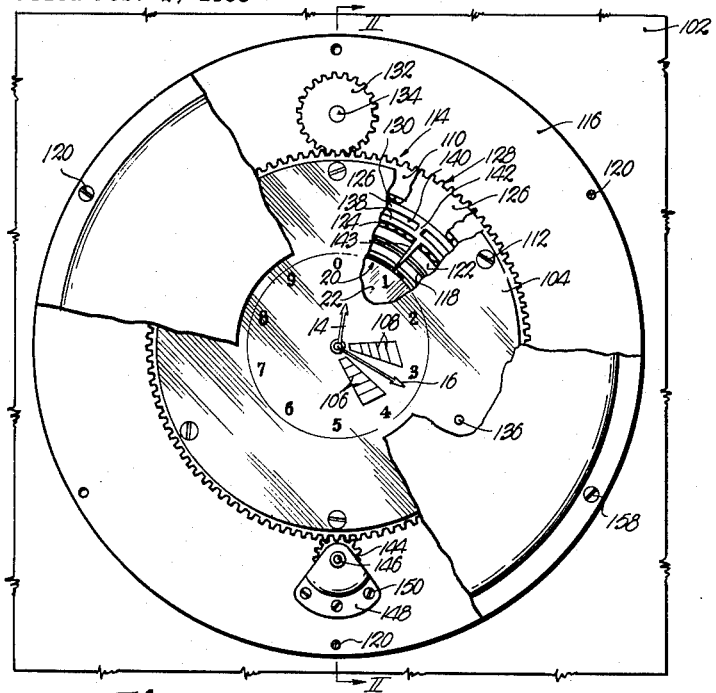
Figure 1 is a front elevational view of the indicating device forming a part of this invention, showing the same mounted for use with an existing altimeter, parts being broken away for clarity.
Figure 2:
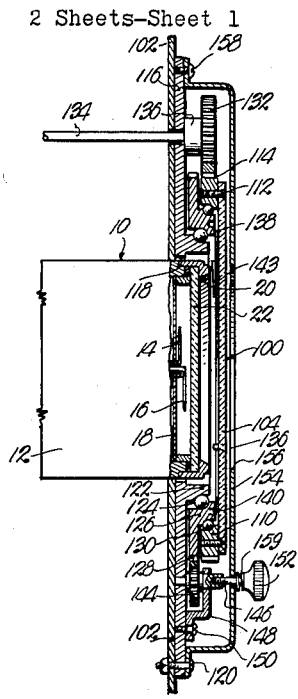
Figure 2 is a cross-sectional view taken on line II—II of Fig. 1.

Referring now particularly to Figs. 1 and 2, there is illustrated one manner of rotatably mounting an indicating device 100 forming a part of this invention in operative disposition to an altimeter 10, which altimeter 10 is mounted by means (not shown) to a panel 102 of the aircraft.

Device 100 includes a relatively thin, transparent, rotatable disc 104, having an opposed pair of reference markings 106 thereon. Each marking 106 is preferably a polygonal pattern of spaced, opaque lines 108 etched or otherwise superimposed upon the disc 104.

Disc 104, which may be of glass or clear plastic material, is mounted co-axially upon an annular ring 110 by fastening means 112, which may be screws or the like. Ring 110 is provided with a set of gear teeth 114 circumscribing its outer circumference.

A plate 116 having a circular perforation 118 formed therein of diameter for clearing the housing structure 20 of the altimeter 10 is mounted upon the panel 102 by fastening means 120, as illustrated in Figs. 1 and 2. Plate 116 is provided with an annular flange 112 circumscribing perforation 118 and extending outwardly from plate 116 away from panel 102. Flange 122 is provided about its outer circumference with a raceway for bearing 124.

Rotatably mounted upon bearing 124 is an annular, ring-like member 126 having a raceway for bearing 124 about its inner circumference. Member 126 is provided about its outer circumference with a circumscribing set of gear teeth 128 and also with a circumscribing raceway for a bearing 130. Ring 110 is provided about its inner circumference with a cooperating raceway for bearing 130.

It is thus apparent that ring 110 is rotatably mounted by bearing 130 upon member 126, which is in turn rotatably mounted by bearing 124 upon flange 122.

A pinion 132 is rigidly mounted upon a rotatable shaft 134, the shaft 134 being suitably journalled as at 136 to plate 116 and extending rearwardly through perforations in plate 116 and panel 102 for operable coupling to other parts of the apparatus of this invention as hereinafter set forth. Shaft 134 is positioned to place the pinion 132 in intermeshing relationship with the gear teeth 114 of the ring 110, to rotate ring 110 and disc 104 when shaft 134 is rotated.

An inwardly extending stop pin 136 is mounted upon disc 104, pin 136 being radially disposed from the center of disc 104 by a distance disposing the pin in opposed relationship to member 126. Member 126 is provided on a face 138 thereof proximate to disc 104 and pin 136 with a substantially annular groove 140, interrupted to present a stop block 142 at one point in its circumference. Pin 136 extends into groove 140 and serves to limit the extent of relative rotation between disc 104, and thereby ring 110, and the member 126, when the pin 136 comes into engagement with the block 142. A suitable index marking pointer 143 is provided on the member 126 extending inwardly in radial alignment with the operative edge of block 142. The pointer 143 is visible to the pilot to indicate the minimum altitude at which block 142 is set and is shown at 100 feet in Fig. 1. The pin 136 is shown in Fig. 1 out of engagement with the block 142 and at 340 feet.

An adjustment pinion 144 is provided for intermeshing with gear teeth 128 of member 126, pinion 144 being mounted on a shaft 146, which is journalled in a bracket 148 mounted upon plate 116 as at 150. A knob 152 is mounted at the outer end of shaft 146. By means of knob 152, pinion 144 may be rotated to position member 126, and more particularly block 142 thereof, for engagement with pin 136 to limit the rotation of ring 110 and disc 104 to rotational positions above a certain predetermined minimum altitude.

A suitable pan-like cover 154, having a large circular perforation 156 for clearing the dial face 18 of altimeter 10 to view and a second smaller perforation for clearing shaft 146, is mounted upon plate 116 by fastening means 158 and 120 to furnish a protective covering for ring 110, member 126, bearings 124 and 130, and pinions 132 and 144. Perforation 156 may be provided with a transparent closing window, if desired.

A compression spring 159 is disposed upon shaft 146 in frictional engagement with knob 152 and cover 154 to prevent unintended rotation of shaft 146 and pinion 144 caused by accidental contact with knob 152 or by torque transmiteed to member 126 from ring 110 when pin 136 is in engagement with block 142.

Figure 3:
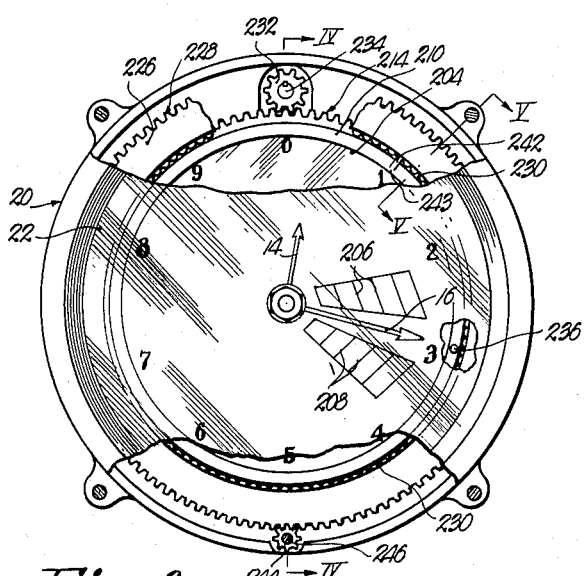
Fig. 3 is a front elevational view of the indicating device forming a part of this invention, showing the same mounted as an integral part of a different type of altimeter, parts being broken away for clarity.
Figure 4:
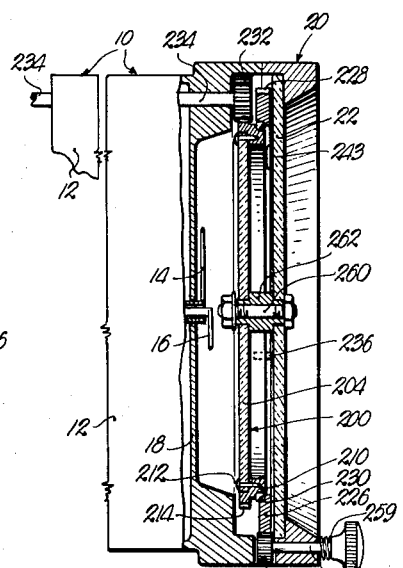
Fig. 4 is a cross-sectional view taken on line IV—IV of Fig. 3.
Figure 5:
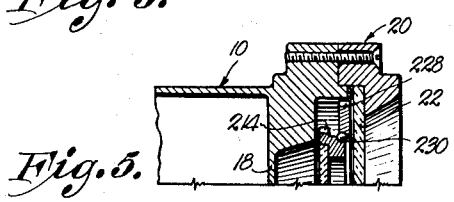
Fig. 5 is a slightly enlarged cross-sectional view taken on line V—V of Fig. 3.

Referring now to Figs. 3, 4 and 5 of the accompanying drawings, wherein is illustrated an embodiment of part of this invention having structure mounting the indicating device internally of the altimeter 10 and as an integral part thereof, it is seen that an indicating device 200 is provided, which corresponds in all respects not hereinafter specifically discussed to device 100 above described. Device 200 includes a transparent disc 204 having reference markings 206 thereon made up of opaque lines 208. An annular ring 210 is provided about its outer circumference with a set of gear teeth 214 and a raceway for bearing 230. Disc 204 is coaxially secured to ring 210 by suitable fastening means 212.

Disc 204 is rotatably mounted at its center to the crystal 22 of altimeter 10 by a shaft 260 and is spaced inwardly from crystal 22 by a suitable spacer 262.

Rotatably mounted upon bearing 230 is an annular member 226 having a set of gear teeth 228 about its outer circumference.

A pinion 232 is rigidly secured to a rotatable shaft 234 suitably journalled in the housing 20 of the altimeter. Shaft 234 is positioned to place the pinion 232 in intermeshing relationship with gear teeth 214 of ring 210, to rotate the disc 204 when shaft 234 is rotated. Shaft 234 extends outwardly from the rear housing 12 of altimeter 10 for external coupling as will be hereinafter explained; in this connection it should be noted that shaft 234 is the exact functional equivalent of shaft 134 shown in Figs. 1 and 2.

Ring 210 is provided with a stop pin 236 engageable with a stop block 242 on member 226 in the same fashion and for the same purposes as the pin 136 and block 142. It is notable that block 242 is elongated in form to present a visible index pointing end 243. The block 242 is shown at 100 feet in Fig. 3.

Similarly, an adjustment pinion 244 intermeshing with gear teeth 228 of member 226 is provided on shaft 246 journalled in the housing 20 of altimeter 10, and a knob 252 is mounted on shaft 246, there being a compression spring 259 disposed on shaft 246 between knob 252 and housing 20 and in frictional engagement therewith.

Referring now to Figs. 6 and 7 of the accompanying drawings, there is shown that part of the apparatus of this invention which operatively couples the device 100 or 200 to the DME 24 of the aircraft for controlling the operation of the device 100 or 200 responsive to an output 31 or 32 of the DME 24. It will be understood that references hereinafter and numerals in Figs. 6 and 7 pertaining to structure shown in the embodiment of the device 100 and its mounting illustrated in Figs. 1 and 2 are equally applicable to the corresponding structure of the embodiment of the device 200 and its mounting illustrated in Figs. 3, 4 and 5.

In Fig. 6, a four-pole, single-throw switch 302 is provided adjacent the pilot's position in the aircraft, as indicated by its disposition to the right of the dotted line 300 in Fig. 6, structure which may normally be located remotely from the pilot being shown to the left of line 300 in Figs. 6 and 7. Switch 302 has four sections 302$a$, 302$b$, 302$c$ and 302$d$.

Switch sections 302$c$ and 302$d$ are in series with a pair of power lines 304 and 306, which are adapted for coupling to a source of single-phase, alternating current power (not shown), which in aircraft is normally 26 volts A. C. Sections 302$c$ and 302$d$ are connected by conductors 308, 310, 312 and 314 to a power winding 316 of a reversible, single phase electric motor 318. The rotor of motor 318 is operatively coupled through a slip-clutch 320 to a pinion 322. Motor 318 is also conventionally provided with a control winding 324.

Sections 302$c$ and 302$d$ are also connected by conductors 308, 326, 312 and 330 to the power terminals 332 and 334 of a servo-amplifier 336. Servo-amplifier 336 may be any of a number of types of direct current servo-amplifier of conventional design having a pair of sets of input terminals 337—338 and 340—342 adapted for coupling to a pair of external direct current circuits whose respective voltage levels and relative polarity are to be compared and a pair of output terminals 346—348 adapted for coupling to an external circuit including a motor such as 318 to be controlled by the variable electrical output from terminals 346—348. The exact construction of such servo-amplifier 336 forms no part of this invention and, since the nature, design and functioning of such servo-amplifiers is well known in the art, it need here be further explained only that the servo-amplifier 336 is provided with conventional internal parts (not shown) and operates as a differential or comparing device to produce at its output terminals 346—348 a variable electrical output of magnitude and polarity corresponding to the difference in relative polarity and level of two varying external direct current voltages to be compared which may be fed to the pairs of input terminals 337—338 and 340—342.

The output from terminals 346—348 of the servo-amplifier 336 is connected to the control winding 324 of motor 318 by conductors 350, 352 and 354.

The input terminals 337—338 are connected with the variable direct current voltage output 31 from the terminals 34—36 of DME 24 by a circuit traceable from terminal 34 through conductor 356, switch section 302$b$, conductor 358 to terminal 337, and from terminal 338 through conductors 360, 362, and 364 to terminal 36. It may be noted that the range indicating voltmeter 40 is also normally connected to terminals 34 and 36 of DME 24 by conductors 366 and 368.

A direct current reference voltage of fixed, predetermined level corresponding to the maximum or "full range" voltage ever presented at terminals 34—36 of DME 24 is made available, selectively by virtue of a singe-pole, double-throw switch 370, either from a suitable battery 372 or from terminals 374—376 on the power section 28 of DME 24. Since such fixed voltage is normally used for reference internally of the DME 24, it will usually be available therein for use also with the apparatus of this invention. In such cases battery 372 may be used merely for checking purposes or battery 372 and switch 370 even eliminated.

The fixed reference voltage from terminals 374—376 is imposed across voltage divider resistance 378 having a manually adjustable tap 380 thereon through a circuit traceable from terminal 374 through conductor 382, switch 370, conductor 384, switch section 302a, conductor 386, voltage divider 378, conductor 362, conductor 388 and conductor 390 to terminal 376. Battery 372 is selectively connectable in series between conductors 384 and 388 through conductors 392 and 394 and switch 370.

The tap 380 is manually adjustable by the pilot through conventional tapping or switching structure (not shown in mechanical detail) to selectively impose across a resistance element 396 of a potentiometer 398 a fixed direct current reference voltage of a level corresponding to the position of the tap 380 on the voltage divider 378 with respect to the end of the latter connected to conductor 362. The purpose of the tap 380 is to permit adjustment of the reference voltage across element 396 to different predetermined levels corresponding to glide-slopes commencing different predetermined distances from an airport. The circuit from tap 380 through potentiometer 398 may be traced from tap 380 through conductor 400, element 396, conductor 402 and conductor 362 to the voltage divider 378.

It may here be conveniently pointed out that the conductor 362 and its connected conductors, including conductors 360, 402 and 404, constitute the "ground" or common zero voltage level portion of the various direct current circuits of Fig. 6.

The resistance element 396 of potentiometer 398 is elongated and annularly disposed, and for straight glide-slopes will be linear in electrical resistance with respect to angular distances along its length, although it is to be understood that element 396 could be made non-linear in electrical resistance to provide for arcuate glide-slopes.

The potentiometer 398 is provided with rotatable shaft 406 having a conducting contact arm 408 mounted thereon, there being an electrical contact 410 carried by the arm 408 in sliding, electrically contacting relationship with the element 396.

It will be seen that a direct current voltage of level proportional to the portion of element 396 disposed electrically between the rotatable contact 410 and the "grounded" end of element 396 connected through conductor 402 to conductor 362 is fed to the input terminals 340—342 of servo-amplifier 336 through a circuit traceable from terminal 342 through conductor 412, flexible conductor 414, arm 408, contact 410, a portion of resistance element 396, conductor 402, "ground" conductor 362, conductor 360 and conductor 416 to terminal 340.

Shaft 406 of potentiometer 398 is operatively coupled by a pinion 418 thereon intermeshing with a pinion 420 on a shaft 422 to a gear 424 on shaft 422. The turns ratio between pinions 418 and 420 will preferably be such that the entire element 396 is traversed by the contact 410 during one revolution of the gear 424.

Gear 424 intermeshes with the pinion 322 on the drive shaft of motor 318 and also with a pinion 426 on shaft 134 associated through pinion 132 with the ring 110 and disc 104 of device 100. The size of gear 424 and the turns ratio between pinion 426 and gear 424 are preferably chosen so that gear 424 will make one full revolution for each full revolution of the ring 110.

In operation, as the aircraft approaches an airport, the variable direct current voltage output 31 from terminals 34 and 36 of the DME 24 will gradually decrease in magnitude proportionately as the range of the aircraft from the airport decreases. By observing the range indicating device 30, or its above described mechanical equivalent if the mechanical output 32 of the DME 24 is used for range indication purposes, the pilot may determine when the aircraft is approaching a predetermined range from the airport at which the aircraft should be guided onto its glide-slope. The pilot thereupon closes the switch 302, thereby furnishing power to the servo-amplifier 336 and closing the other circuits mentioned above. Upon the closing of switch 302, the variable voltage output 31 from the DME is fed to the servo-amplifier 336 at terminals 337—338. Simultaneously, the fixed reference voltage from terminals 374—376 of the power section 28 of DME 24, or from the battery 372, is imposed across the voltage divider 378. Depending upon the setting of tap 380, which will correspond to the predetermined range at which the glide-slope approach is to commence, a certain fixed voltage will be imposed across the resistance element 396 of potentiometer 398. By virtue of the turns ratio between the gearing provided between ring 110 and shaft 406, the rotatable contact 410 of potentiometer 398 will be positioned upon the resistance element 396 at a point corresponding to the positioning of reference markings 106 on the disc 104. Momentarily, such positioning of the contact 410, assuming that the switch 302 has just been closed, will be such as to deliver to the servo-amplifier 336 at the terminals 340-342 an input in the nature of a direct current voltage differing from the output 31 of DME 24 fed to terminals 337—338 of servo-amplifier 336 in polarity and by an amount corresponding to the displacement of the markings 106 and 108 of disc 104 from the position where same should be at the range corresponding to such output 31 of the DME 24.

The servo-amplifier 336 determines the differences between the respective inputs to its terminals 337—338 and 340—342 and produces therefrom at terminals 346—348 an electrical output which is fed to the control winding 324 of the motor 318. As long as the servo-amplifier 336 is feeding an output to the control winding 324 of motor 318, motor 318 will be operated and through pinion 322 will rotate the gear 424, thereby also simultaneously repositioning ring 110, disc 104 with markings 106 thereon and the rotatable arm 408 of potentiometer 398 bearing contact 410. When the motor 318 has rotated the gear 424 to the proper position corresponding to the predetermined desired glide-slop altitude for the particular range corresponding to the output 31 of DME 24, the voltage input to terminals 340—342 of the servo-amplifier 336, which is determined by the position of contact 410 of the potentiometer 398, will be equal to the input to terminals 337—338 of the servo-amplifier 336 from terminals 34—36 of the DME 24. When such equality of inputs has been achieved, the servo-amplifier 336 will cease to produce any output at its terminals 346—348, and, accordingly, no excitation will be imposed upon the control winding 324 of motor 318 and motor 318 will cease to operate, leaving the markings 106 of disc 104 positioned at the desired glide-altitude corresponding to the range of the aircraft from the airport.

It will be understood that as the aircraft approaches the airport and the voltage level of output 31 decreases, small momentary differences of voltages between the inputs 337—338 and 340—342 to the servo-amplifier 336 will occur, which will result in small outputs at the terminals 346—348 of the servo-amplifier 336, thereby operating the motor 318 to maintain the gear 424 and hence the markings 106 on disc 104 properly and continuously positioned. The pilot may then, by so manipulating the controls of the aircraft as to maintain the indicating hand 16 of the altimeter positioned between the markings 106 and 108 on disc 104, keep the aircraft on the desired glide-slope.

The adjustable stop for the disc 104, effected by stop pin 136 and manually positionable stop block 142, is used to establish a predetermined minimum reference altitude below which the markings 106 of disc 104 will not rotate. Such predetermined minimum altitude is normally chosen so that if the aircraft levels off at such altitude, the pilot will be able to guide the plane on in to the airport by visual observation of the ground, such stop means serving to prevent the pilot from following the glide-slope reference indicating markings 106 until the plane has been flown into the ground and/or an obstruction.

Referring now to Fig. 7, there is shown another embodiment of the control structure for coupling the output 32 of the DME 24 to the ring 110 of the altitude-reference indicating device 100. Similarly illustrated and numbered parts in Fig. 7 will be understood to be the equivalent of the corresponding parts shown in Fig. 6 and described in connection therewith, except as hereinafter expressly noted. In Fig. 7, the rotating shaft output 32 of DME 24 is operatively coupled through a gear box 700 containing intermeshed gears 702 and 704 of suitable turns ratio to a shaft 706 upon which is mounted a pinion 708. The turns ratio of the gear box 700 corresponds to the variable tap 380 provided on the voltage divider 378 shown in the embodiment of Fig. 6, in that such ratio determines the change of range of the aircraft from the airport through which the desired glide-slope is to be indicated by the markings 106 on disc 104.

A double-pole single-throw switch 710 is connected in series with alternating current power lines 504 and 506, which are adapted for coupling to a source of single phase, alternating current power (not shown). Conductors 712 and 714 couple the alternating current power coming through switch 710 to input terminals 537—538 of a servo-amplifier 536. The servo-amplifier 536 may be any type of conventional alternating current servo-amplifier, the nature, design and functioning of which is well known in the art. Besides the set of input terminals 537—538, servo-amplifier 536 is provided with a set of input terminals 540—542 and a set of output terminals 546—548. It will be understood that the servo-amplifier 536 is adapted to compare two alternating current inputs fed to its input terminals 537—538 and 540—542 with respect to the relative electrical phasing therebetween and to produce and present at output terminals 546—548 an electrical output corresponding to such difference in phase between the two above mentioned inputs from external circuits connected to terminals 537—538 and 540—542, respectively. The output from terminals 546—548 of the servo-amplifier 536 are connected to control winding 524 of a reversible electric motor 518 by means of conductors 550 and 554. The alternating current power available at switch 710 is connected to a power winding 516 of the motor 518 by conductors 514 and 510. Motor 518 has a rotor operably coupled through a slip-clutch 520 to a pinion 522.

The alternating current power from switch 710 is also fed through conductors 712, 716, 714 and 718 to a rotor field winding 720 of a syncro-transmitter 722. The winding 720 of syncro-transmitter 722 is mounted upon a shaft 724 for rotation therewith, there being a pinion 726 on shaft 724 intermeshing with the pinion 708. Syncro-transmitter 722 has a Y-wound stator winding 728 coupled to a Y-wound stator winding 730 of a syncro-control transformer 732 by conductors 734, 736 and 738. Syncro-control transformer 732 is provided with a rotor winding 740 mounted upon a shaft 742 for rotation therewith. Rotor winding 740 of the syncro-control transformer 732 is connected with the input terminals 540—542 of the servo-amplifier 536 by conductors 744 and 746. A pinion 748 is mounted upon the rotor shaft 742 of the syncro-control transformer 732 and intermeshes with a pinion 520 on a shaft 622 having a gear 624 thereon. Gear 624 intermeshes with a pinion 626 on the shaft 134, gear 624 and pinion 626 corresponding to the gear 424 and the pinion 426, respectively, of the embodiment shown in Fig. 6. Gear 624 also intermeshes with the drive pinion 522 of the motor 518.

In operation, the control means shown in Fig. 7 for coupling the output 32 of DME 24 to the ring 110 of the indicating device 100 for rotating the disc 104 of the latter is in many respects analogous to the operation of the embodiment shown in Fig. 6. As the aircraft approaches the airport, shaft 32 of the DME 24 gradually rotates, making one complete revolution durig the travel of the aircraft from the maximum range of the DME 24 to the airport. As shaft 32 rotates, turning gear 702, the pinion 704 and hence the rotor 724 of the syncro-transmitter 722 make a number of revolutions, depending upon the turns ratio provided in gear box 700. By watching his range indicating device, which may be in the form of a voltmeter 40 as shown in Fig. 6 or in the nature of a mechanically actuated pointer as above described, the pilot may determine when the aircraft has reached that range from the airport where the glide-slope approach should be commenced. Such range will correspond to one, namely the last, revolution of the pinion 704 as the aircraft approaches the airport. He thereupon will close the switch 710 supplying a single phase, alternating current to the input terminals 537—538 of the servo-amplifier 536 and to the rotor winding 720 of the syncro-transmitter 722.

As the rotor winding 720 of syncro-transmitter 722 rotates relative to the stator winding 728, the relative phase of the alternating current voltage induced in winding 728 and coupled therefrom to winding 730 of the syncro-control transformer 732 will be varied. The rotor winding 740 of the syncro-control transformer 732 is rotated along with the markings 106 on the disc 104 in manner analogous to that by which the contact 410 was rotated with the markings 106 in the embodiment shown in Fig. 6. As the rotor winding 740 is rotated relative to the stator winding 730 of the syncro-control transformer 732, the phase of the voltage induced from the stator winding 730 into the rotor winding 740 will be further varied in respect of the reference voltage fed to the servo-amplifier at terminals 537—538. Such voltage induced in the winding 740 will be exactly in phase with the voltage fed to terminals 537—538 and also rotor winding 720 of the syncro-transmitter only when the rotational positions of the winding 720 of the syncro-transmitter 722 and the winding 740 of the syncro-control transformer 732 are the same.

Assuming that when switch 710 was closed by the pilot, the markings 106 were not properly positioned in correspondence to the range of the aircraft from the airport, as indicated by the relative rotational position of shaft 32 of DME 24, a voltage will be fed from the winding 740 of the syncro-control transformer 732 to input terminals 540—542 of the servo-amplifier 536 which differs in phase from the voltage fed to the servo-amplifier 536 at its input terminals 537—538. Such difference in the phases of the two inputs to the servo-amplifier 536 are compared by the servo-amplifier 536 which presents an electrical output corresponding to their difference at its terminals 546—548. Such output from terminals 546—548 is then fed to the control winding 524 of the motor 518 which rotates the gear 624 until the markings 106 are properly positioned in predetermined corresponding phase to the distance of the aircraft from the airport. When the markings 106 and 108 have been so properly positioned, the windings 720 and 740 of the syncro-transmitter 722 and the syncro-control transformer 732, respectively, will be in the same relative rotational positions and the phase of the voltage fed to the input terminals 540—542 of the servo-amplifier from the winding 740 will be identical to that of the voltage input to terminals 537—538. Accordingly, no output will be produced at the terminals 546—548 and motor 518 will not be operated until the winding 720 has been rotated relative to the winding 740 by the turning of shaft 32 of the DME 24.

It will now be seen that the apparatus provided by this invention constitutes a simple, accurate, reliable and relatively inexpensive answer to the problems discussed hereinabove.

It will be understood that various details of the apparatus hereof may be varied without departing from the spirit of this invention, and, accordingly, it is intended to be limited only by the scope of the appended claims.

Having thus described the invention, what is claimed as new and desired to be secured by Letters Patent is:

1. Glide-slope altitude-reference indicating apparatus for use in aircraft provided with an altimeter having a rotatable pointer adapted for indicating the altitude of the aircraft and with distance measuring equipment adapted for making measurements of the distance of the aircraft from a preselected ground point and having a variable output corresponding to said measurements, said apparatus comprising a rotatable altitude-reference indicating device; structure mounting the device in proximity to the pointer for rotation about an axis in alignment with the axis of rotation of the pointer; a prime mover operatively coupled to the device for rotating the device when the prime mover is operated; and control means operatively coupling the prime mover with the equipment and adapted for controlling the operation of the prime mover responsive to said output of the equipment to rotate the device in predetermined, dependent relationship to said measurements made by the equipment, said control means comprising a variable-output mechanism having moveable parts operatively coupled with the device for movement thereby as the device is rotated, the output of said mechanism being variable as said parts are moved and thereby dependent upon the rotational position of the device, and variable-output differential means coupled to the output of the equipment and to the output of the mechanism and adapted for offsetting the output of the mechanism against the output of the equipment to produce a variable, resultant output from the differential means corresponding to a difference between the outputs of the mechanism and the equipment, the output of the differential means being coupled to the prime mover and adapted for controlling the operation of the latter.

2. Glide-slope altitude-reference indicating apparatus for use in aircraft provided with an altimeter having a rotatable pointer adapted for indicating the altitude of the aircraft and with distance measuring equipment adapted for making measurements of the distance of the aircraft from a preselected ground point and having a variable output corresponding to said measurements, said apparatus comprising a rotatable altitude-reference indicating device; structure mounting the device in proximity to the pointer for rotation about an axis in alignment with the axis of rotation of the pointer; an electric motor adapted for coupling to a source of electrical power, said motor having a winding adapted for coupling to an external control circuit and a rotor operatively coupled with the device for rotating the latter when the motor is operated; a mechanism adapted to produce a variable output and having rotatable mechanical elements, rotatable electrical elements and stationary electrical elements, the rotatable mechanical elements being operatively coupled with the device for rotation therewith, the rotatable electrical elements being operatively coupled with the rotatable mechanical elements for rotation therewith relative to the stationary electrical elements, said output of the mechanism being variable as the relative positions of the rotatable electrical elements and the stationary electrical elements are changed; a servo-amplifier having a pair of sets of electrical input terminals and a set of electrical output terminals and adapted for producing and presenting at said output terminals a variable, resultant electrical output corresponding to a difference between the electrical characteristics of the inputs from a pair of external electrical circuits coupled to said sets of input terminals; means including an electrical circuit, responsive to the output of the mechanism and operatively coupling said output of the mechanism with one set of input terminals of the servo-amplifier; means, including an electrical circuit, responsive to the output of the equipment and operatively coupling said output of the equipment with the other set of input terminals of the servo-amplifier; and means, including an electrical control circuit, operatively coupling said winding with the set of output terminals of the servo-amplifier, whereby the energization of said winding is varied as said output of the servo-amplifier varies to control the operation of the motor.

3. Glide-slope altitude-reference indicating apparatus for use in aircraft provided with an altimeter having a rotatable pointer adapted for indicating the altitude of the aircraft and with distance measuring equipment adapted for making measurements of the distance of the aircraft from a preselected ground point and having a variable, direct current, electrical output of potential corresponding to said measurements in accordance with a predetermined relationship therebetween, said apparatus comprising a rotatable altitude-reference indicating device; structure mounting the device in proximity to the pointer for rotation about an axis in alignment with the axis of rotation of the pointer; an electric motor adapted for coupling to a source of electrical power, said motor having a winding adapted for coupling to an external control circuit and a rotor operatively coupled with the device for rotating the latter when the motor is operated; and control means operatively coupling the winding with the equipment and adapted for controlling the operation of the motor responsive to said output of the equipment to rotate the device in predetermined, dependent relationship to said measurements made by the equipment, said control means comprising a source of direct current voltage of predetermined level; a potentiometer having an annularly disposed, elongated resistance element and a rotatable contact arm provided with an electrical contact thereon adapted for engaging the element at a plurality of points throughout the length of the latter, the element being connected in series with said source of direct current voltage; means operably coupling the arm with the device for rotation therewith; a direct current servo-amplifier having a pair of sets of electrical input terminals and a set of electrical output terminals and adapted for producing and presenting at said output terminals a variable, resultant electrical output corresponding to an algebraic difference between the voltage levels of a pair of direct current inputs from a pair of external electrical circuits coupled to said sets of input terminals; an electrical circuit coupling said contact of the potentiometer with the other set of input terminals of the servo-amplifier; and an electrical control circuit for the motor coupling said winding of the motor with the output terminals of the servo-amplifier.

4. Apparatus as set forth in claim 3, wherein is provided manually adjustable means for setting the voltage level of said direct current source at different predetermined levels.

5. Glide-slope altitude-reference indicating apparatus for use in aircraft provided with an altimeter having a rotatable pointer adapted for indicating the altitude of the aircraft and with distance measuring equipment adapted for making measurements of the distance of the aircraft from a preselected ground point and having a variable, mechanical shaft output corresponding in relative rotational position of the shaft to said measurements in accordance with a predetermined relationship therebetween, said apparatus comprising a rotatable altitude-reference indicating device; structure mounting the device in proximity to the pointer for rotation about an axis in alignment with the axis of rotation of the pointer; an electric motor adapted for coupling to a source of single phase, alternating current, electrical power, said motor having a winding adapted for coupling to an external control circuit and a rotor operatively coupled with the device for rotating the latter when the motor is operated; and control means operatively coupling the winding with the equipment and adapted for controlling the operation of the motor responsive to said output of the equipment to rotate the device in predetermined, dependent relationship to said measurements made by the equipment, said control means comprising a source of single phase, alternating current electrical power; a syncro-transmitter having a pair of coils including a rotatable coil and a stationary coil; means operably coupling the rotatable coil of the syncro-transmitter with the shaft of the equipment for rotation therewith relative to the stationary coil of the syncro-transmitter; an electric circuit coupling one of said pair of coils of the syncro-transmitter in series with said source of alternating current power; a syncro-control transformer having a pair of coils including a stationary coil and a rotatable coil; means operably coupling the rotatable coil of the syncro-control transformer with the device for rotation therewith; an electrical circuit coupling the other of said pair of coils of the syncro-transmitter with one of said pair of coils of the syncro-control transformer; an alternating current servo-amplifier having a pair of sets of input terminals and a set of output terminals and adapted for producing and presenting at said output terminals a variable, resultant electrical output corresponding to a difference between the phases of a pair of alternating current inputs from a pair of external electrical circuits coupled to said sets of input terminals; an electrical circuit coupling the other of said pair of coils of the syncro-control transformer with one set of input terminals of the servo-amplifier; an electrical circuit coupling said source of alternating current power with the other set of input terminals of the servo-amplifier; and an electrical circuit coupling said winding of the motor with the output terminals of the servo-amplifier.

6. Glide-slope altitude-reference indicating apparatus for use in aircraft provided with an altimeter having a rotatable pointer adapted for indicating the altitude of the aircraft and with distance measuring equipment adapted for making measurements of the distance of the aircraft from a preselected ground point and having a variable output corresponding to said measurements, said apparatus comprising an altitude-reference indicating device including a rotatable annular ring provided with a circumferential set of gear teeth, and a transparent, circular disc having a reference marking thereon adapted for indicating a desired rotational positioning for said pointer, said disc being concentrically mounted on the ring for rotation therewith; structure mounting the device in proximity to the pointer for rotation of the ring and disc about an axis in alignment with the axis of rotation of the pointer; and means operably coupling the device with the equipment and adapted for rotating the ring and disc responsive to said output of the equipment and in predetermined, dependent relationship to said measurements made by the equipment, whereby said marking will indicate said desired positioning for said pointer corresponding to varying magnitudes of said measurements.

7. Glide-slope altitude-reference indicating apparatus for use in aircraft having mounted therein an altimeter provided with an angularly calibratable altitude dial face, an altitude indicating pointer mounted adjacent the dial face for rotation relative thereto and a transparent viewing crystal mounted in spaced, covering relationship to the dial face and the pointer, and having provided therein distance measuring equipment adapted for making measurements of the distance of the aircraft from a preselected ground point and for presenting a variable output corresponding to said measurements, said apparatus comprising a rotatable altitude-reference indicating device comprising a rotatable annular ring provided with a circumferential set of gear teeth, and a transparent, circular disc having a reference marking thereon, said disc being concentrically mounted on the ring for rotation therewith; structure mounting the ring upon the aircraft in external proximity to the altimeter for rotation relative to the dial face about an axis in alignment with the axis of rotation of the pointer, said ring being positioned to dispose the disc externally of the crystal and in spaced relationship thereto; and means, including a rotatable pinion external to the altimeter and engageable with the set of gear teeth of the ring, operably coupling the device with the equipment and adapted for rotating the device responsive to said output of the equipment and in predetermined, dependent relationship to said measurements made by the equipment.

8. Glide-slope altitude-reference indicating apparatus for use in aircraft having mounted therein an altimeter provided with an angularly calibratable altitude dial face, an altitude indicating pointer mounted adjacent the dail face for rotation relative thereto and a transparent viewing crystal mounted in spaced, covering relationship to the dial face and the pointer, and having provided therein distance measuring equipment adapted for making measurements of the distance of the aircraft from a preselected ground point and for presenting a variable output corresponding to said measurements, said apparatus comprising a rotatable altitude-reference indicating device comprising a rotatable annular ring provided with a circumferential set of gear teeth, and a transparent, circular disc having a reference marking thereon, said disc being concentrically mounted on the ring for rotation therewith; structure mounting the ring upon the altimeter for rotation relative to the dial face about an axis in alignment with the axis of rotation of the pointer, said ring being within the altimeter and positioned to dispose the disc between the dial face and the crystal and in spaced relationship thereto; and means, including a pinion within the altimeter engageable with the set of gear teeth of the ring and mounted upon a rotatable shaft extending externally of the altimeter, operably coupling the device with the equipment and adapted for rotating the device responsive to said output of the equipment and in predetermined, dependent relationship to said measurements made by the equipment.

9. Glide-slope altitude-reference indicating apparatus for use in aircraft having mounted therein an altimeter provided with an angularly calibratable altitude dial face, an altitude indicating pointer mounted adjacent the dial face for rotation relative thereto and a transparent viewing crystal mounted in spaced, covering relationship to the dail face and the pointer, and having provided therein distance measuring equipment adapted for making measurements of the distance of the aircraft from a preselected ground point and for presenting a variable output corresponding to said measurements, said apparatus comprising a rotatable altitude-reference indicating device comprising a rotatable annular ring provided with a circumferential set of gear teeth, and a transparent, circular disc having a reference marking thereon, said disc being concentrically mounted on the ring for rotation therewith, there being a protruding stop pin fixedly mounted upon the device for rotation therewith; structure rotatably mounting the ring to dispose the disc in spaced proximity to the pointer and for rotation about an axis in alignment with the axis of rotation of the pointer; a member having parts engageable with the stop pin of the device, said member being mounted for rotation relative to the dial face about an axis in alignment with the axis of rotation of the pointer; means operably coupled with the member and adapted for manual manipulation to rotate the member to a predetermined position relative to the dial face; and means operably coupling the device with the equipment and adapted for rotating the device responsive to said output of the equipment and in predetermined, dependent relationship to said measurements made by the equipment.

References Cited in the file of this patent

UNITED STATES PATENTS

| | | |
|---|---|---|
| 2,134,132 | Koster | Oct. 25, 1938 |
| 2,538,843 | McGuire | Jan. 23, 1951 |
| 2,579,902 | Carbonara et al. | Dec. 25, 1951 |
| 2,663,868 | Tasker | Dec. 22, 1953 |